(12) United States Patent
Levin

(10) Patent No.: US 6,567,073 B1
(45) Date of Patent: May 20, 2003

(54) AMBIDEXTROUS COMPUTER MOUSE

(75) Inventor: Burton L. Levin, Lake Oswego, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 288 days.

(21) Appl. No.: 09/591,890

(22) Filed: Jun. 9, 2000

(51) Int. Cl.[7] .............................. G09G 5/00; G09G 5/08
(52) U.S. Cl. ........................ 345/163; 345/156; 345/157; 345/158; 345/159; 345/166; 345/169
(58) Field of Search ................................ 345/163–169, 345/156–159, 123

(56) References Cited

U.S. PATENT DOCUMENTS

| | | | |
|---|---|---|---|
| 3,541,541 A | 11/1970 | Engelbart | |
| 4,816,810 A | 3/1989 | Moore | |
| 5,405,168 A | 4/1995 | Holt | |
| 5,409,107 A | 4/1995 | Browne | |
| 5,428,368 A | * 6/1995 | Grant | 345/163 |
| 5,562,270 A | 10/1996 | Montague | |
| 5,566,087 A | * 10/1996 | Voigt et al. | 345/163 |
| 5,570,112 A | 10/1996 | Robinson | |
| 5,576,733 A | * 11/1996 | Lo | 345/163 |
| 5,581,277 A | 12/1996 | Tajiri | |
| 5,615,438 A | 4/1997 | Field | |
| 5,636,822 A | 6/1997 | Hendershot et al. | |
| 5,661,502 A | 8/1997 | Cheng | |
| D383,453 S | 9/1997 | Scenna et al. | |
| 5,678,800 A | 10/1997 | Markussen | |
| D389,821 S | 1/1998 | Martella | |
| 5,723,821 A | 3/1998 | Klinger et al. | |
| 5,726,683 A | 3/1998 | Goldstein et al. | |
| 5,731,807 A | 3/1998 | Feierbach | |
| 5,750,934 A | 5/1998 | Kuljis | |
| 5,755,410 A | 5/1998 | Ambrose et al. | |
| 5,788,203 A | 8/1998 | Nitti | |
| 5,790,098 A | 8/1998 | Lin | |
| 5,790,102 A | 8/1998 | Nassimi | |
| 5,798,755 A | 8/1998 | Holgate | |
| 5,805,142 A | 9/1998 | Byrne | |
| 5,805,143 A | 9/1998 | Myers | |
| 5,815,553 A | 9/1998 | Baugh et al. | |
| 5,826,842 A | 10/1998 | Paulse et al. | |
| 5,833,180 A | 11/1998 | Baranowski | |
| 5,844,775 A | 12/1998 | Lundberg | |
| 5,850,661 A | 12/1998 | Lawrence | |
| 5,867,147 A | 2/1999 | Schivley | |
| 5,880,715 A | * 3/1999 | Garrett | 345/156 |
| 5,883,619 A | 3/1999 | Ho et al. | |
| 5,886,685 A | 3/1999 | Best | |
| 5,894,303 A | 4/1999 | Barr | |
| 5,907,318 A | 5/1999 | Medina | |
| 5,925,007 A | 7/1999 | Ashline | |
| 5,985,042 A | 11/1999 | Fiedler | |
| 6,005,553 A | 12/1999 | Goldstein et al. | |
| 6,031,522 A | 2/2000 | Strand | |
| 6,034,671 A | 3/2000 | Cheng et al. | |
| 6,097,369 A | * 8/2000 | Wambach | 345/157 |
| 6,144,110 A | * 11/2000 | Matsuda et al. | 307/10.1 |
| 6,166,721 A | * 12/2000 | Kuroiwa et al. | 345/163 |
| 6,211,861 B1 | * 4/2001 | Rosenberg et al. | 345/163 |
| 6,322,405 B1 | * 11/2001 | Griffith et al. | 114/144 B |

OTHER PUBLICATIONS

Window 95 Product Team Introducing Microsoft Windows, 1995, Microsoft Press, 126, 127.*
Jacquelyn Gavron and Joseph Moran How to Use Microsoft NT 4.0 WorkStation, Macmillan Computer Publishing 1996.*

* cited by examiner

Primary Examiner—Bipin Shalwala
Assistant Examiner—Prabodh Dharia
(74) Attorney, Agent, or Firm—Chernoff, Vilhauer, McClung & Stenzel, LLP

(57) ABSTRACT

In some applications, particularly home and public uses, computers are used concurrently by right and left-handed persons. An ambidextrous computer mouse includes a selector permitting the user to conveniently switch the computer functions activated by the respective mouse buttons for right or left-handed use.

10 Claims, 2 Drawing Sheets

AMBIDEXTROUS COMPUTER MOUSE

BACKGROUND OF THE INVENTION

The present invention relates to a mouse for a computer and, more particularly, to a mouse adapted for use by persons of either handedness.

One of the most common accessories for a personal computer (PC) is a mouse for translating motion of a user's hand into signals that an attached PC can use to move a cursor or pointer on a display. Computer mice can be found in a variety of physical embodiments. Typically a mouse comprises a body that serves as a grip for the user's hand and as a structure for mounting a movement sensing system and two or more mouse buttons for selecting computer functions. Mice are available with electro-mechanical, opto-mechanical, or optical movement sensing systems. The electro- and opto-mechanical systems typically incorporate a ball arranged for rotation in the body and protruding from the bottom of the mouse into contact with the surface on which the mouse is resting. Movement of the mouse causes the ball to rotate. Electrical or optical transducers in the body convert the motion of the ball into electrical signals proportionate to the extent of movement of the mouse in x and y directions. The motion of the mouse can also be sensed with an optical system. One optical system requires a special mouse pad with grid lines on a reflective surface. As the mouse is moved over the grid changes in the direction of reflected light are optically detected and transformed to electrical signals. Another mouse employs a digital camera to take periodic photographs of the surface on which the mouse is moved. A digital signal processor analyzes the series of images to determine the direction and extent of motion. Typically, the electrical signals generated by the movement sensing system are converted to a serial, digital data stream by a microprocessor in the mouse and sent to the computer over a cable or by infrared or radio frequency signaling. The computer uses the x and y movement data obtained from the mouse to repeatedly recalculate the position of the cursor on the display.

In addition to the movement sensing system, the mice are generally equipped with at least two mouse buttons for selecting and initiating computer functions. A mouse may be equipped with additional buttons and mice are available with other forms of user input devices, such as finger operated rollers that can be used to move a cursor in a displayed electronic document. Referring to FIG. 1, mouse buttons 10 and 12 are actuators for switches 14 and 16 within the body of the mouse. The switches 14 and 16 have normally-open and normally-closed input terminals connected to either a "high" 18 or "low" 20 voltage source. When the left button 10 is depressed, the normally open contacts of switch 14 are closed and the voltage at the output terminal 22 is switched from low to high. At the terminal 24 of the mouse microprocessor 26 which is electrically connected to output terminal 22 the voltage is likewise switched from low to high. When the mouse button 12 is depressed, the voltage at microprocessor terminal 28 will switch from low to high. Typically, the mouse microprocessor 26 converts the signals generated by the movement sensing system and the mouse button inputs to a serial, digital data stream which is sent to the computer. For example, whenever a mouse conforming to the requirements of an International Business Machines (IBM) PS/2 computer is moved or a mouse button is depressed, the mouse microprocessor sends three bytes of data to the computer. The second and third byte contain the x and y movement values and the first two bits of the first byte indicate the states (depressed or released) of the left 10 and right 12 mouse buttons, respectively.

Depressing or "clicking" a mouse button, signals the computer to initiate a function. The function is determined by the operating system and application program in use with the computer. For example, depressing or clicking the "left" mouse button commonly causes the computer to select and change the state of the cursor on the display. As a result, the user of a word processing program may insert characters or take some other action at the cursor's displayed location in a displayed electronic document. On the other hand, if the user holds the button in a depressed position and moves the mouse, the cursor can be "dragged" over an "area" of the displayed document and that area can be selected for some common action. Depressing the "right" button may cause a context related menu to be displayed.

As the use of a mouse has become more universal, ergonomics has assumed an increasing role in mouse design. For example, mice can be obtained that are designed for either right-handed or left-handed users. Strand, U.S. Pat. No. 6,031,522 discloses an ergonomic mouse having a removable body shell. The shell fits over a base mouse that includes a movement sensing system and switches. Different shells can be installed on the base mouse to accommodate varying hand sizes, different handedness, or varying numbers of buttons for different computers, applications, or special user requirements. A mouse designed for either right or left-handed use improves user comfort and efficiency and may reduce injuries related to mouse use. Such a mouse is acceptable and desirable if the computer has a single user. However, in a home environment, a computer may be used concurrently by a number of users of different handedness. Likewise, in libraries, schools, and other applications where computer use is shared, a mouse shaped for ambidextrous use is highly desirable, if not necessary.

Standardization of the function associated with a particular mouse button is another ergonomic aspect of mouse design. One button is typically positioned for more convenient actuation by the index finger and a second button is positioned for actuation by the middle finger. Typically the cursor select function is assigned to the mouse button operated by the index finger because the function is the predominant function initiated by mouse operation. Standardization in function assignment increases the convenience of mouse operation and reduces learning time. However, standardization of function assignment presents a problem when a mouse is used by persons of different handedness. If a function is assigned to the left mouse button of a right-handed mouse (the button operated by the index finger of the right hand), a left-handed user of that mouse must actuate the button with the middle finger to obtain the same function. This operation may be awkward and is confusing if the user also operates a computer with a left-handed mouse. Computer operating systems typically provide for reassignment of functions for left and right-handed mice. While this is useful in maintaining the desired relationship between the finger used to initiate the function for right handed and left-handed mice, it increases user confusion if a mouse with an opposite button-function relationship is used. Further, many computer users may not be sufficiently familiar with the operating system to find and change the function-button relationship.

Moore, U.S. Pat, No. 4,816,810, discloses a remote acceptance switch that permits positioning the mouse with one hand and actuation of a remotely located mouse button with the second hand. Likewise, one could provide both left and right-hand mice and a selector switch to permit the user to choose the appropriate mouse. However, additional switches, cords, and mice on the work surface are not usually desirable.

What is desired, therefore, is a convenient way of switching the mouse button-computer function relationship so that a mouse can be conveniently configured for use by either hand.

SUMMARY OF THE INVENTION

The present invention overcomes the aforementioned drawbacks of the prior art by providing a mouse for a computer comprising a mouse switch for selectively initiating a first computer function and a selector to cause the mouse switch to initiate a second computer function. One embodiment of the invention uses a double pole, double throw switch to reverse the connections between mouse buttons and the corresponding mouse switch actuation signal terminals of the mouse microprocessor. As a result, the relationship of the mouse buttons to the switch state signals output to the computer are reversed. In a second embodiment, a switch provides a selector signal to the microprocessor software causing the microprocessor to signal the attached PC that a mouse button has actuated when the other button is actually actuated. As result, a function initiated by the attached PC in response to actuation of one mouse button can be initiated by the other mouse button maintaining a familiar button-to-function relationship for persons of either handedness.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
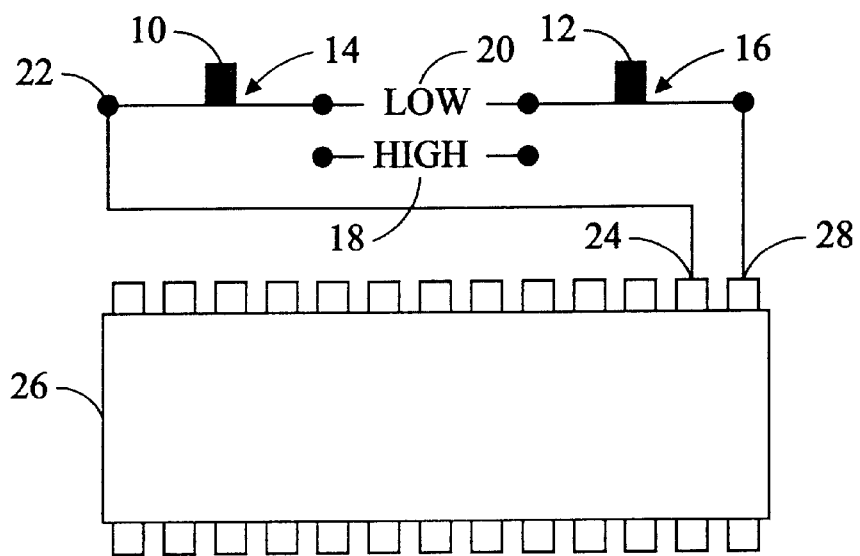
FIG. 1 is a schematic of a prior art mouse switch electrical circuit.
Figure 2:
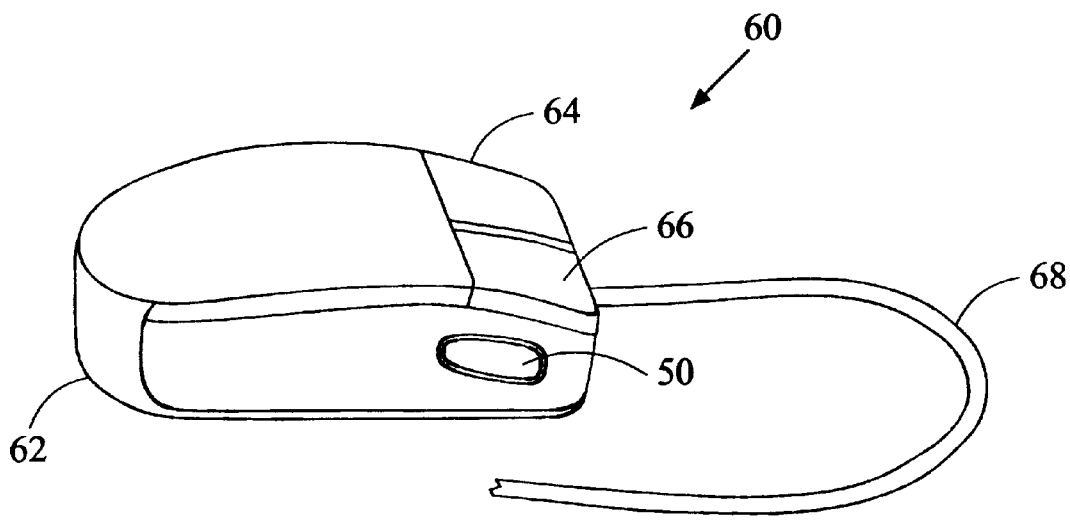
FIG. 2 is a perspective drawing of a computer mouse with three mouse buttons.

A three-button computer mouse 60 is illustrated in FIG. 2. One function of a mouse 60 is to translate motion of a user's hand into signals that an attached computer can use to position a cursor or pointer on a display. Movement sensing is typically accomplished opto-mechanically, electro-mechanically or optically. Mouse movement detection by mechanical means typically relies on a ball (not shown) restrained for rotation within the body 62 of the mouse 60. The ball protrudes from the bottom of the mouse and contacts the surface supporting the mouse. Movement of the mouse 60 causes the ball to rotate. A first roller (not shown) contacts the ball and rotates a transducer (not shown) proportionate to movement of the mouse 60 in the x direction. A second roller (not shown) rotates a second transducer in response to mouse movement in they direction. The transducer may be an electrical device or an optical shaft encoder that outputs electrical pulses in response to rotation. The rate of pulsing produced by the transducer is directly related to the speed and direction of mouse movement.

Mouse motion sensing may also be performed by an optical system. One type of optical system generates pulses in response changes in the reflection of light from a special mouse pad. Electrical pulses are produced as light is reflected either toward or away from photo sensors by grid lines in a reflective surface of the mouse pad. The photo sensors are aligned to detect either x or y movement of the mouse. In another optical mouse, a digital camera periodically photographs the surface over which the mouse is moved. A digital signal processor analyzes the series of images to determine the direction and extent of mouse movement.

Figure 3:
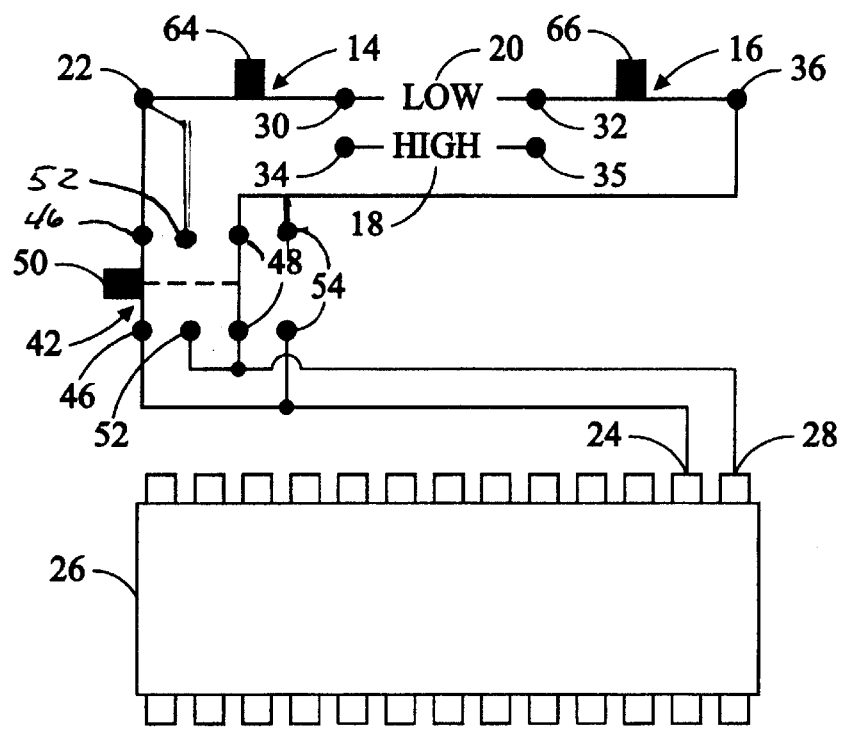
FIG. 3 is a schematic of a mouse switch electrical circuit incorporating a selector switch.

A second function of a mouse 60 is to signal the user's intent for the computer to initiate some function. The user signals intention to the computer by depressing or "clicking" one of the mouse buttons 64 and 66. Referring to FIG. 3, a mouse button 64 or 66 is an actuator for an electrical switch 14 or 16 located within the mouse body 62. In FIG. 3, the actuators of switches 14 and 16 are illustrated as push-buttons, but it is understood that mouse buttons 64 and 66 may actuate switches 14 and 16 with lever or other known actuators. Each of the mouse switches 14 and 16 has a relatively low 20 and a relatively high 18 voltage input. In the mouse button circuit of FIG. 3, the normally closed contacts 30 and 32 of switches 14 and 16, respectively, are connected to the low voltage input 20. However, reversed logic with the normally closed inputs connected to the high voltage may also be used. When a switch 14 or 16 is depressed, the normally open contact 34 or 35, respectively, is closed and the output terminal 22 or 36, as appropriate, is connected to the high voltage input 18. The change in voltage provides a switch actuation signal to the microprocessor 26. The output terminals 22 and 36 of switches 14 and 16 are electrically connected to terminals of the mouse processor 26. The microprocessor 26 determines the state (depressed or not actuated) of the left and right buttons from the mouse switch signal, the value of the voltage at terminals 24 and 28, respectively.

Typically the mouse microprocessor 26 converts the pulses output by the movement sensing transducers and the mouse button switch signals into a serial data stream for transmission to the attached computer (PC). For example, whenever the mouse is moved or a mouse button is actuated, a mouse processor 26 conforming to the requirements of an IBM® model PS/2 computer. outputs three bytes of data. The second and third bytes contain mouse movement data. The first and second bits of the first byte are switch state signals indicating the state of the left and right mouse switches. The serial data stream may be transmitted over a mouse cord 68 as illustrated in FIG. 2 or converted into infrared light or radio frequency signals for transmission to the PC by a cordless mouse. The attached PC initiates a computer function in response to receipt of a switch state signal indicating actuation of one of the mouse switches 14 and 16.

The function initiated by the PC in response to depression of a mouse button is determined by the software running on the computer. However, typically a click of the mouse button positioned for operation by the user's index finger causes the present position of the cursor on the display to be selected and the cursor to be activated. If a word processing program is running on the computer, the user can insert text or take some other action at the point designated by the cursor once the cursor is activated. If the user continues to depress the button while moving the mouse, an area of the displayed document is selected for some action. If a graphics program is running on the computer, a click of the button can be used to select a beginning point for a line or other graphic element. Moving the mouse while the button is depressed or "dragging" will cause the computer to "draw" the element.

To accommodate users of either handedness, the operating system may allow the user to reassign the mouse button—function relationships for left and right-hand mice. This permits users to retain a familiar relationship between the actuating finger and the function performed by the PC. It also allows assignment of the most dominant task (cursor selection) to the index finger without regard to the user's handedness. However, reassignment of the mouse button-function relationship typically requires knowledge of the operating system and the location of an operating system menu that controls the assignment. Users may not be sufficiently familiar with the operating system to perform this reassignment. This is particularly true in home or public applications where users are likely to have widely varying familiarity with the computers they are operating. Furthermore, concurrent users would likely find it awkward and inefficient to use this method to switch the handedness of the mouse. The present inventor concluded that a function selector on the mouse would greatly facilitate the use of a mouse in those environments where one mouse is likely to be used by persons of either handedness.

FIG. 3 is an electrical schematic diagram for one aspect of a function selector for an ambidextrous mouse. The selector 42 comprises a double pole, double throw switch connected between the output terminals 22 and 36 of mouse switches 14 and 16 and the mouse switch actuation signal terminals 24 and 28 of an exemplary mouse microprocessor 26. Typically, a computer mouse includes a mouse microprocessor which computes the movement of the mouse, determines the actuation state of the mouse buttons, and converts this information to a serial data stream which is transmitted to the attached computer. The mouse microprocessor includes a register to hold the logic level conversion of the mouse button actuation signals. Although a microprocessor is typical of a computer mouse, the mouse button actuation state could be determined by any logic device capable of converting the mouse actuation signal to a logic level and holding that level stable. References herein to a mouse microprocessor are understood to include other known logic devices capable of determining the actuation state of the mouse buttons. In an initial condition, the normally closed terminals 46 and 48 of the selector 42 provide a conductive path between output terminals 22 and 36 of the switches 14 and 16 and the mouse switch actuation signal terminals 24 and 28, respectively, of the mouse processor 26. When the selector button 50 is depressed, the normally open terminals 52 and 54 of the selector switch 42 are closed. The output terminal for the "left" mouse switch 14 is then connected to terminal 28 of the mouse microprocessor 26 and the "right" mouse switch 16 is connected to terminal 24 reversing the mouse button to computer function relationship. The selector 42 can be conveniently operated by a slide actuator or push button 50 on the mouse. FIG. 2 illustrates a switch actuator 50 located for operation with the left thumb. An additional, similar actuator could be incorporated on the opposite side for actuation by the right thumb or the selector could be set to default to the right-hand mouse button-function arrangement unless the actuator 50 is moved by the left thumb. Either constant pressure or toggling switches may be used for the selector 42.

Figure 4:
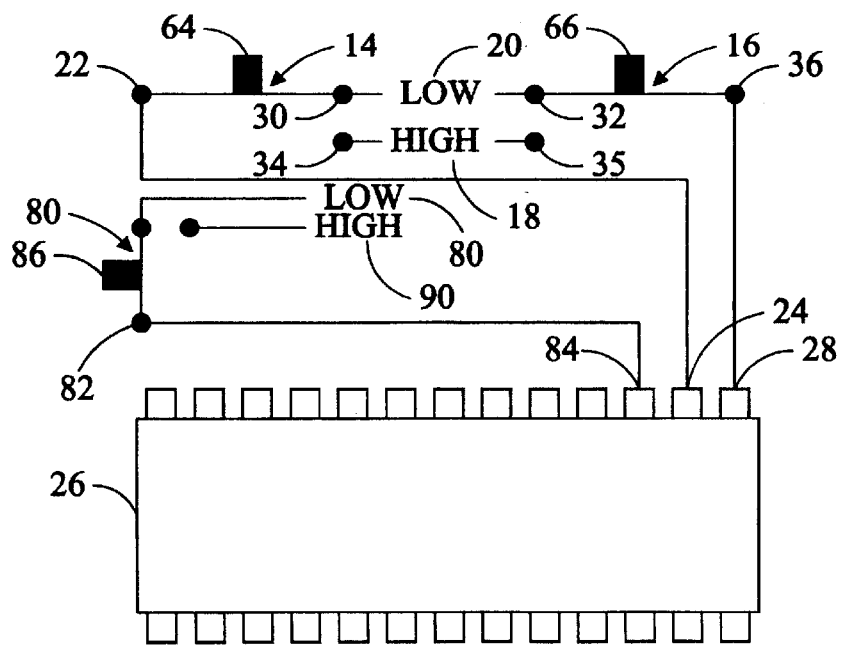
FIG. 4 is a schematic of mouse switch electrical circuit incorporating an alternative selector.

An electrical schematic of a second aspect of the mouse button-function selector is illustrated in FIG. 4. Components of the mouse that are similar to those of the mouse of FIG. 3 are identified with the same numerals. Computer functions are initiated by depressing either of the mouse buttons 64 or 66 which actuate the mouse switches 14 and 16, respectively. Actuating a mouse switch 14 or 16 will cause the voltage at the connected terminal 24 or 28 of the mouse processor 26 to switch from low to high. In response to the change in value of the mouse switch actuation signal, the mouse processor 26 will output a bit or switch state signal in the data stream to the computer indicating the state (depressed or released) of each of the switches. A selector 80 is connected to low 84 and high 90 voltage inputs and has an output terminal 82 connected to a terminal 84 of the mouse processor 26. When the selector button 86 is depressed, the voltage at terminal 84 will be switched from low to high. The value of the selector signal at terminal 84 can be used by the software of the mouse processor 26 to cause the mouse to output a switch state signal to the PC indicating that switch 14 has been actuated when mouse switch 16 has actually been actuated. Likewise, actuation of switch 14 would result in the output of a switch state signal by the mouse processor 26 indicating that switch 16 was actuated. As a result, the relationship of the initiated function and the actuating finger can be consistent for persons of either handedness even though only one mouse is used.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A computer mouse operable by persons of either handedness comprising:

(a) a mouse body arranged for engagement by a hand of a user;

(b) a first mouse switch arranged in said mouse body for actuation by one of a first finger of a first hand and a second finger of a second hand, actuation of said first mouse switch selecting a first computer function;

(c) a second mouse switch arranged in said mouse body for actuation by one of a second finger of said first hand and a first finger of said second hand, actuation of said second mouse switch selecting a second computer function; and (d) a function selector arranged in said mouse body and operable by a hand engaging said mouse body, operation of said function selector causing actuation of said first mouse switch to select said second function and actuation of said second mouse switch to select said first function.

2. The mouse of claim 1 further comprising a logic device arranged in said mouse body to output a first switch state signal to select said first computer function in response to input of a first mouse switch actuation signal and a second switch state signal to select said second computer function in response to input of a second mouse switch actuation signal, said first mouse switch actuation signal being a function of an actuation state of said first mouse switch and an actuation state of said function selector and said second mouse switch actuation signal being a function of an actuation state of said second mouse switch and said actuation state said function selector.

3. A computer mouse operable by persons of either handedness comprising:
(a) a mouse body arranged for engagement by a hand of a user;
(b) a first mouse switch arranged in said mouse body for actuation by one of a first finger of a first hand and a second finger of a second hand;
(c) a second mouse switch arranged in said mouse body for actuation by one of a second finger of said first hand and a first finger of said second hand; (d) a logic device arranged in said mouse body to output a first switch state signal to select a first computer function in response to input of a first mouse switch actuation signal and a second switch state signal to select a second computer function in response to input of a second mouse switch actuation signal; and
(e) a function selector switch to selectively connect an output terminal of said first mouse switch to a first mouse switch actuation signal terminal of said logic device, actuation of said first mouse switch inputting said first mouse switch actuation signal to said logic device, and an output terminal of said second mouse switch to a second mouse switch actuation signal terminal of said logic device, actuation of said second mouse switch inputting said second mouse switch actuation signal to said logic device; and to, alternatively, selectively connect said output terminal of said second mouse switch to said first mouse switch actuation signal terminal, actuation of said second mouse switch inputting said first mouse switch actuation signal to said logic device, and said output terminal of said first mouse switch to said second mouse switch actuation signal terminal, actuation of said first mouse switch inputting said second mouse switch actuation signal to said logic device.

4. The mouse of claim 2 wherein said function selector comprises:
(a) a switch for selectively altering a value of a selector signal to said logic device; and
(b) a logic device software instruction to cause said logic device to selectively output one of said first switch state signal and said second switch state signal in response to said value of said selector signal and a state of at least one of said first and said second mouse switches.

5. A computer mouse comprising:
(a) a logic device outputting a first switch state signal in response to a first mouse switch signal input and a second switch state signal in response to a second mouse switch signal input;
(b) a first mouse switch to selectively alter a first mouse switch actuation signal in response to a first user input;
(c) a second mouse switch to selectively alter a second mouse switch actuation signal in response to a second user input; and
(d) a switch to selectively input said first mouse switch actuation signal to a first mouse switch signal terminal of said logic device and input said second mouse switch actuation signal to a second mouse switch signal terminal of said logic device and to alternatively input said second mouse switch actuation signal to said first mouse switch signal terminal and input said first mouse switch actuation signal to said second mouse switch signal terminal.

6. A computer mouse comprising:
(a) a microprocessor outputting one of a first and a second switch state signal in response to a user input;
(b) a first mouse switch to selectively alter a first mouse switch actuation signal in response to a user input actuating said first mouse switch;
(c) a second mouse switch to selectively alter a second mouse switch actuation signal in response to a user input actuating said second mouse switch;
(d) a switch to selectively alter a value of a selector signal to said microprocessor in response to a user input; and
(e) microprocessor software to cause said microprocessor to selectively output
    (i) said first switch state signal in response to alteration of said first mouse switch actuation signal;
    (ii) said second switch state signal in response to alteration of said first mouse switch actuation signal and alteration of said selector signal;
    (iii) said second switch state signal in response to alteration of said second mouse switch actuation signal; and
    (iv) said first switch state signal in response to alteration of said second mouse switch actuation signal and alteration of said selector signal.

7. A mouse for a computer having an operating system, said operating system responsive to a switch state signal to select a computer function, said mouse comprising:
(a) a mouse body arranged for engagement by a hand of a user;
(b) a first mouse switch arranged in said mouse body for actuation by one of a first finger of a first hand and a second finger of a second hand, actuation of said first mouse switch causing transmission of a first switch state signal to said operating system;
(c) a second mouse switch arranged in said mouse body for actuation by one of a second finger of said first hand and a first finger of said second hand, actuation of said second mouse switch causing transmission of a second switch state signal to said operating system; and
(d) a function selector arranged in said mouse body and operable by a hand engaging said mouse body, actuation of said function selector causing actuation of said first mouse switch to cause transmission of said second switch state signal to said operating system and actuation of said second mouse switch to cause transmission of said first switch state signal to said operating system.

8. The mouse of claim 7 further comprising a logic device to output a first switch state signal in response to a first mouse switch actuation signal and a second switch state signal in response to a second mouse switch actuation signal, said first mouse switch actuation signal being a function of an actuation state of said first mouse switch and an actuation state of said function selector and said second mouse switch actuation signal being a function of an actuation state of said second mouse switch and said actuation state said function selector.

9. A mouse for a computer having an operating system, said operating system responsive to a switch state signal to select a computer function, said mouse comprising:
(a) a mouse body arranged for engagement by a hand of a user;
(b) a first mouse switch arranged in said mouse body for actuation by one of a first finger of a first hand and a second finger of a second hand;
(c) a second mouse switch arranged in said mouse body for actuation by one of a second finger of said first hand and a first finger of said second hand;
(d) a logic device to output a first switch state signal to said operating system in response to a first mouse switch actuation signal and a second switch state signal in response to a second mouse switch actuation signal; and (e) a function selector switch to selectively connect a terminal of said first mouse switch to a first mouse switch actuation signal terminal of said logic device, actuation of said first mouse switch inputting said first mouse switch actuation signal to said logic device, and a terminal of said second mouse switch to a second mouse switch actuation signal terminal of said logic device, actuation of said second mouse switch inputting said second mouse switch actuation signal to said logic device; and to, alternatively, selectively connect said terminal of said second mouse switch to said first mouse switch actuation signal terminal, actuation of said second mouse switch inputting said first mouse switch actuation signal to said logic device, and said terminal of said first mouse switch to said second mouse switch actuation signal terminal, actuation of said first mouse switch inputting said second mouse switch actuation signal to said logic device.

10. The mouse of claim 8 wherein said function selector comprises:

(a) a switch selectively altering a value of a selector signal to said logic device in response to a user input; and (b) a logic device software instruction to cause said logic device to selectively output one of said first switch state signal and said second switch state signal in response to said value of said selector signal and an actuation state of at least one of said first and said second mouse switches.

* * * * *

UNITED STATES PATENT AND TRADEMARK OFFICE
CERTIFICATE OF CORRECTION

PATENT NO.    : 6,567,073 B1                              Page 1 of 1
DATED         : May 20, 2003
INVENTOR(S)   : Burton L. Levin It is certified that error appears in the above-identified patent and that said Letters Patent is hereby corrected as shown below:

Column 3,
Line 63, replace "they" with -- the y --.

Column 4,
Line 45, delete the "." after "computer".

Column 7,
Line 10, insert a return before "(d)".

Signed and Sealed this

Twenty-eighth Day of October, 2003

JAMES E. ROGAN
*Director of the United States Patent and Trademark Office*